UNITED STATES PATENT OFFICE.

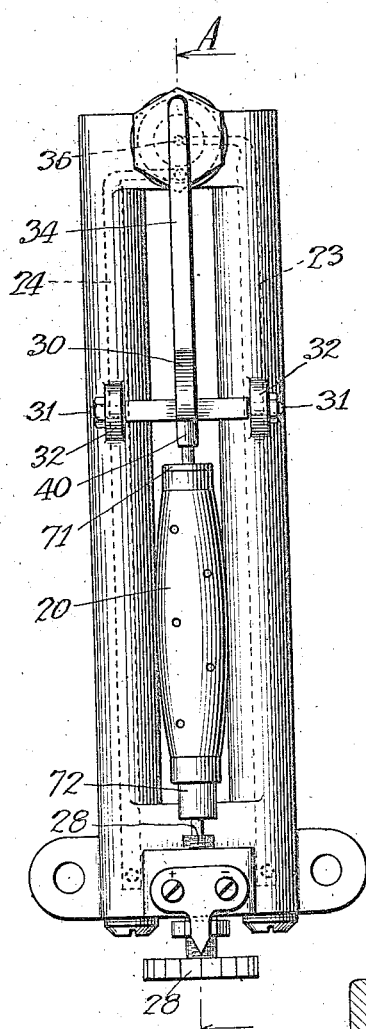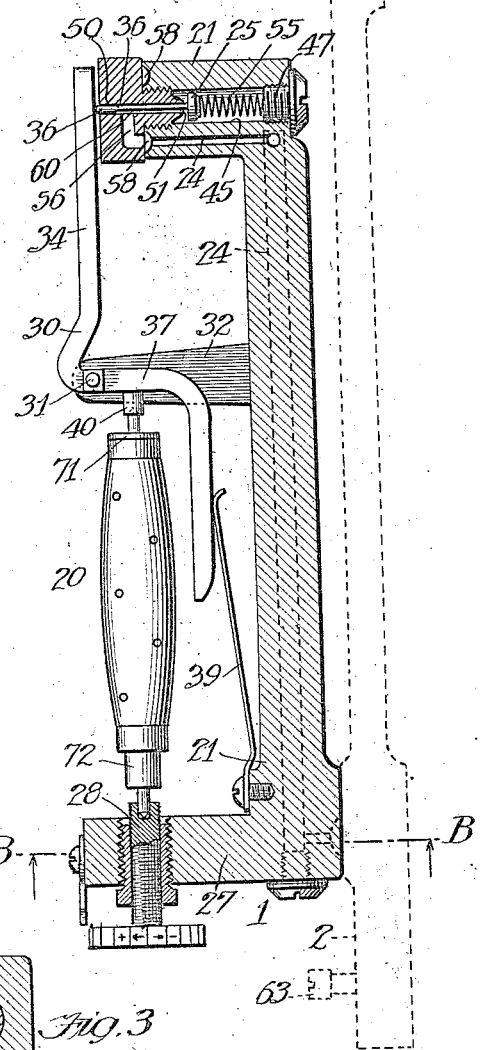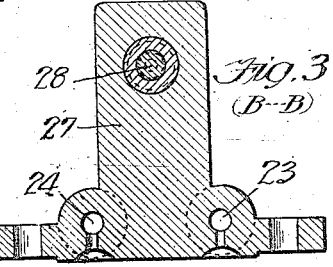

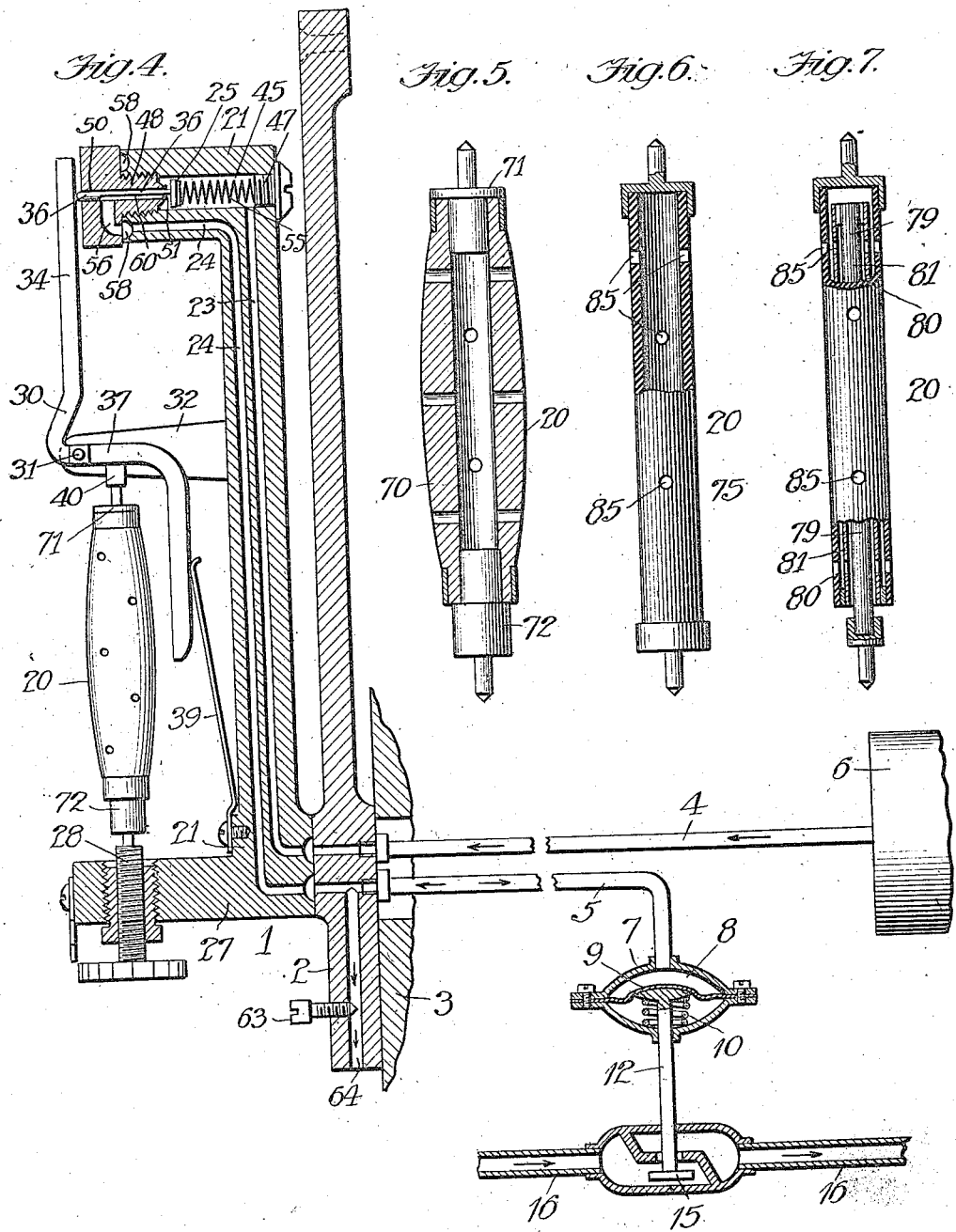

JOHN H. SWAN, OF CHICAGO, ILLINOIS, ASSIGNOR TO KLIPFEL MANUFACTURING CO., OF CHICAGO, ILLINOIS, A CORPORATION OF ILLINOIS.

AUTOMATIC CONTROLLING DEVICE FOR FLUID-PRESSURE MOTORS.

1,277,771.      Specification of Letters Patent.      Patented Sept. 3, 1918.

Application filed December 13, 1915. Serial No. 66,536.

*To all whom it may concern:*

Be it known that I, JOHN H. SWAN, a citizen of the United States of America, and a resident of Chicago, county of Cook, and State of Illinois, have invented certain new and useful Improvements in Automatic Controlling Devices for Fluid-Pressure Motors, of which the following is a specification.

The main objects of this invention are to provide an improved form of apparatus adapted for automatically controlling fluid pressure motors according to some quality or condition of the atmosphere; to provide interchangeable controlling members or parts for said apparatus adapted to respond mechanically to variations in the humidity and temperature of the atmosphere respectively; to arrange the valves and associated parts of said apparatus in such manner as to control the supply of fluid to the motor according to the atmospheric conditions to be relied upon; to equip a fluid pressure motor with controlled supply and restricted waste means of improved form; to provide hygrometric means formed and arranged in improved manner for closing a fluid supply port by increase of humidity; to provide an improved form of anti-friction valve, stem, and port mechanism adapted to effect a restricted waste when the valve is open; to provide improved means for adjusting the motor waste; and to provide an improved form of controlling member responsive to certain changes in the condition of the atmosphere.

An illustrative embodiment of this invention is shown in the accompanying drawings, in which:

Figure 1 is a front elevation of the demountable wall part of an atmospheric control apparatus.

Fig. 2 is a section substantially on the line A—A of Fig. 1.

Fig. 3 is a section substantially on the line B—B of Fig. 2.

Fig. 4 is a diagram of conventional character showing the operative relation of the several parts of a complete embodiment of the invention.

Fig. 5 is a view of an atmospheric control member responsive to changes in humidity, partly in central longitudinal section.

Fig. 6 is a view of an atmospheric control member responsive to changes in temperature, partly in central longitudinal section.

Fig. 7 is a view of another form of atmospheric control member responsive to changes in temperature, partly in central longitudinal section.

In the construction shown in the drawings (see Fig. 4), the motor control apparatus proper or demountable wall member 1 is secured demountably on a base 2, which is supported in any desired manner as by securing to the wall 3 of the room in which the instrument 1 is located.

A pair of tubes 4 and 5 communicate with said instrument 1 through said base, one of said tubes 4 being connected to a suitable source of fluid pressure 6, and the other tube 5 communicating with the motor 7, being connected to the pressure chamber 8. Said chamber has a movable wall or diaphragm 9 urged inwardly by yielding means 10. Said diaphragm 9 is operatively connected by the rod 12 to a valve 15 in the pipe 16 arranged to control a supply of fluid adapted either directly or otherwise for affecting the condition of the atmosphere either with respect to humidity or temperature as may be desired and arranged for, and according to the particular form of atmospherically responsive element 20 used in said instrument 1.

Said instrument 1 comprises a frame 21 having a passageway including parts 23 and 24 for fluid, and a valve 25 arranged for closing said passageway. Mounted on said frame at the end opposite from said valve 25 is the atmospherically responsive member 20. Operative means connect said member 20 and said valve whereby the former upon expanding tends to close said valve. For this purpose the member 20 is mounted adjustably at one end on a frame arm 27, as by means of the gage screw 28, the opposite end of said member 20 being carried by a lever 30 of bell crank shape pivoted at the angle formed by its two arms, the pivots 31 being carried on the frame arms 32. One of the lever arms 34 coacts with the stem 36 of said valve 25. The outer arm 37 is urged by the spring 39 mounted on said frame 21 in such manner as to open said valve. The free end of said member 20 is connected to said short arm at 40 adjacent to the fulcrum axis 31 in such manner that the member 20 in expanding opposes said spring 39 and tends to swing the arm 34 so as to permit closure of said valve 25.

The fluid passage 23—24 is enlarged at and adjacent to said valve 25 in such manner as to form a chamber 45 in said frame 21, said chamber being disposed transversely of said frame from front to back, the rear of said chamber being closed by a screw plug 47 and the front part being closed by screw plug 48 mounted in the forwardly enlarged part of said frame.

Said forward plug 48 has a central longitudinal perforation 50, the inner end of which constitutes the port 51 for said valve 25. The valve stem 36 is disposed in said perforation, the outer parts of said stem and the perforation walls being in nearly tight fitting relation, but having sufficient clearance to insure frictionless operation and permitting a small degree of leakage. The outer end of said stem projects normally beyond said plug, and coacts with the adjacent end of the lever arm 34. Said valve is urged toward its seat to close said port 51 by the pressure of the fluid, and may be assisted if desired by yielding means as a helical spring 55 reacting between the rear plug 47 and said valve.

In order to complete the passageway through the front plug 48, the head of said plug is provided with a passage 56 disposed radially from the center aperture 50 outward to a point opposite an annular groove 58 in the adjacent surface of said frame 21, said passage 56 being provided with a rearwardly extending arm communicating with said groove, and said passage 24 communicating with said groove, whereby the fluid passage through said frame is continuous for any setting of the screw plug 48.

In order to prevent too much restriction of flow through said plug 48 past the stem 36, said stem is flattened as at 60 on one side along its inner part between the valve 25 and said radial aperture 56. Unrestricted passage from aperture 50 to aperture 56 is further assured by making the latter aperture of somewhat larger diameter than the former, so that the freedom of flow will not be dependent in any way upon the angular position of the flattened stem 36.

In oreder to provide for manually adjusting the waste from the motor side of said valve 25, a restricting escape valve or screw 63 is placed in operative restricting relation to a waste branch 64 of the fluid passage between said valve and said motor, said branch passage and screw being located preferably in the base 2 as shown in Fig. 4, or in frame 21 as shown in Fig. 10.

The interchangeable atmospherically responsive members 20 are herein designated as hygrometric and thermostatic members respectively, and are all of the same length so as to be interchangeable. The hygrometric member (see Fig. 5) preferably comprises a round bar of wood 70, preferably hollow and fitted with mounting caps 71 and 72, and cut cross-wise of the grain, and having perforations whereby the interior of the wood is exposed to the atmosphere and mechanical responsiveness to changes in humidity is increased. The thermostatic member comprises a rod or bar of material either simple or compound which is readily responsive and sensitive to temperature changes. Said member may be in the form of a bar of hard rubber 75 preferably cylindrical and hollow, and fitted with mounting caps, as in Fig. 6, or said member may be made composite for increasing the variation in length for given changes in temperature as illustrated in Fig. 7, wherein two concentric hard rubber bars 79 and 80 are connected by a third concentric bar 81 having a lower coefficient of expansion for temperature, as for instance metal. The walls of the thermostatic members are perforated as at 85 to insure ventilation and prompt responsiveness to temperature changes.

The operation of the device, with the atmospheric control member 20 in place, is as follows: Assuming that the instrument is to be used for humidity control and that the air is abnormally dry, said control member is so contracted as to permit the spring 39 to actuate the lever 30 and so hold open the fluid pressure supply valve 25, whereby the motor 7 is actuated, in such manner as to open the steam valve 15, and so furnish moisture to the room. As the humidity of the air increases the hygrometric member 20 expands until it overcomes the spring 39 and throws the lever arm 34 outward, thereby permitting the valve spring 39 to partly close the supply valve 25. As soon as the supply of moisture is thus partly cut off the leakage past the restricting screw 63 and past the valve stem 36 is sufficient to partly relieve the pressure in the motor 7, whereupon the motor springs 10 operates to partly close the steam valve 15. The degree of expansion of the hygrometric element 20 and and the resultant action of the automatic control valve 25 and motor 7 is dependent upon the conditions affecting humidity in the room where the hygrometric member is located. Under normal operating conditions the valves and motor diaphragm are caused to fluctuate more or less relative to a medial position depending on the rate of dissipation of the humidity in the room in which the humidity is to be controlled.

When the device is to be used for controlling temperature instead of humidity, a thermostatic element is used in place of the hygrometric element, in which case the operation is substantially the same in every respect except that the valve 25 serves to control the supply of heat furnished to the room instead of moisture.

If it is desired to raise the normal condition of the humidity or temperature in the room, the adjusting screw 28 supporting one end of the member 20 is turned in one direction, as may be indicated by a plus sign, and if said normal condition is to be lowered the screw is turned in the opposite direction as may be indicated by a minus sign.

Although several specific embodiments of this invention are herein shown and described, it will be understood that numerous details of the construction shown may be altered or omitted without departing from the spirit of this invention as defined by the following claim.

I claim:

A frame having a chamber therein, a fluid pressure passage communicating with said chamber, a threaded opening also communicating with said chamber, a headed screw plug closing said threaded opening, said plug having a medial aperture extending the length thereof, said frame having a groove adjacent to and surrounding said threaded opening, a valve stem disposed in said passage, a valve mounted on the inner end of said stem and coacting with the inner end of said plug, said plug having a branch aperture in its head connecting said medial aperture and said annular groove, and a second passage in said frame member communicating with said groove, and atmospherically sensitive means controlling said valve in accordance with changes in the atmosphere.

Signed at Chicago this 10th day of December, 1915.

JOHN H. SWAN.